J. F. BRITT.
ATTACHMENT FOR HARNESS.
APPLICATION FILED FEB. 27, 1911.
1,240,304.
Patented Sept. 18, 1917.
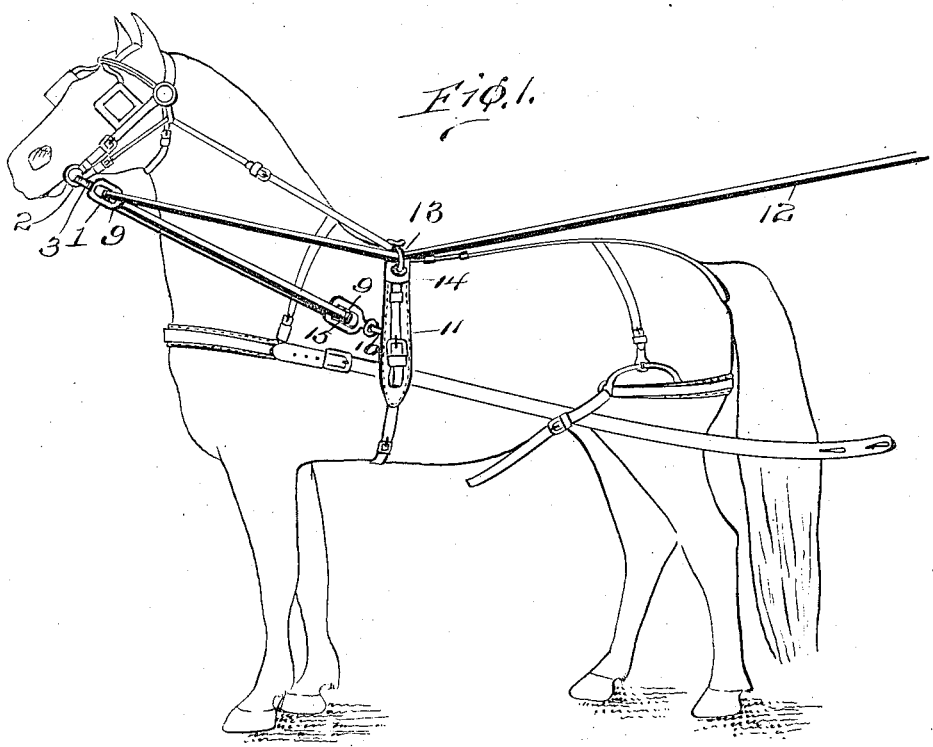
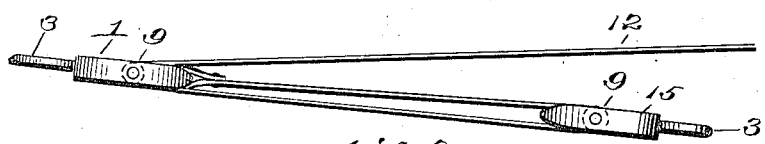
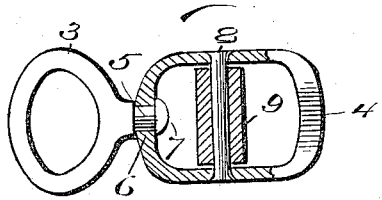
Inventor
J. F. Britt
Witnesses
By John S. Duffie
Attorneys

UNITED STATES PATENT OFFICE.

JAMES F. BRITT, OF PRESCOTT, ARKANSAS.

ATTACHMENT FOR HARNESS.

1,240,304.  Specification of Letters Patent.  Patented Sept. 18, 1917.

Application filed February 27, 1911. Serial No. 611,086.

*To all whom it may concern:*

Be it known that I, JAMES F. BRITT, a citizen of the United States, residing at Prescott, in the county of Nevada and State of Arkansas, have invented certain new and useful Improvements in Attachments for Harness, of which the following is a specification.

My invention has relation to new and useful improvements in devices for controlling, breaking and holding any draft animal from kicking and running away.

Further objects of my invention are to produce a device of the above nature that is simple in construction, efficient in operation and one which may be manufactured at a small cost.

By the use of my invention an excited or runaway horse may be checked or thrown, if necessary, by the use of my device, the manner in which this is performed being fully described in the specification hereinafter.

With the foregoing and other objects in view my invention consists of the novel construction, combination and arrangement of parts as are described in this specification, illustrated in the accompanying drawings forming a part thereof and particularly pointed out in the claim hereunto appended.

Reference being had to the drawings—

Figure 1 is a side view of a horse in harness to which my devices have been applied.

Fig. 2 is a top plan view of the device, showing the manner in which one of the reins is passed through my devices as applied in Fig. 1.

Fig. 3 is a partial side elevational view of my device, partly in vertical section.

Referring more particularly to the drawings, my invention in detail, is described as follows:

The device 1 is connected to the bridle ring 2 by means of a ring 3, which ring is pivotally held to a frame 4 by means of the neck 5 being received by a perforation 6 in said frame 4. A head 7 is provided upon the neck 5 to prevent its removal therefrom. Extending from one side of the frame to the other side thereof at its center is a spindle 8 upon which is rotatably mounted a pulley 9.

In the application of my invention two of my devices are employed, one being attached to the bridle ring 2 as stated, the other being secured to a ring 10 connected to the saddle 11.

I will now proceed to describe the relation of one rein of the harness employed to my devices: The rein 12 is passed over the pulley 9 of the device 1. Thence it travels over the pulley 9 of the device 15, which device is connected to the saddle 11 as stated. Thence the rein travels forward, the forward end thereof being secured to the rear part of said frame 4. This may be accomplished in any suitable manner, the preferred form being, however, that which is illustrated in Fig. 2 in which the rein is passed around the frame 4, being doubled upon itself, a rivet being passed therethrough, which secures the rein against disengagement. Both reins are applied similarly therefore I deem it unnecessary to describe the relationship of the rein upon the opposite side of the draft animal to its respective devices.

By the use of my devices the horse's head may be drawn down upon his chest and held there, should he be running or become unmanageable, until he is under control.

Although I have specifically described the construction of my invention, yet I do not confine myself to such construction but reserve and may exercise the right to make such changes therein as do not depart from the spirit of the invention or the scope of the claim appended.

Having described my invention what I claim as new and desire to secure by Letters Patent, is:

A device of the type described, including a swiveled bit-attached ring, and a saddle-attached ring, each ring being equipped with a roll, one roll-equipped ring having a swivel connection with the front edge of the saddle, at one side thereof and at a point below the plane of the bit-attached ring, a guide-ring fixed to the saddle adjacent the check-rein terret, and a controlling rein having one end connected to the first-referred to ring, said rein being then rove directly through the second-referred to ring and back through the first-referred to ring and through said guide-ring.

In testimony whereof I affix my signature in presence of two witnesses.

JAMES F. BRITT.

Witnesses:
 M. W. BRITT,
 W. V. TOMPKINS.